United States Patent [19]
Avramidis

[11] Patent Number: 5,435,789
[45] Date of Patent: Jul. 25, 1995

[54] INVERTED TOOTH CHAIN CONSTRUCTED WITH LINKS HAVING A SINGLE TOE

[75] Inventor: Stellios A. Avramidis, Howell, Mich.

[73] Assignee: Borg-Warner Automotive, Inc., Sterling Heights, Mich.

[21] Appl. No.: 288,488

[22] Filed: Aug. 10, 1994

[51] Int. Cl.⁶ .................................... F16G 13/00
[52] U.S. Cl. ............................................ 474/206
[58] Field of Search ................ 474/206, 212–217

[56] References Cited

U.S. PATENT DOCUMENTS

| | | |
|---|---|---|
| 579,742 | 3/1897 | Cottie et al. |
| 637,056 | 11/1899 | Whitney . |
| 959,046 | 5/1910 | Belcher . |
| 1,835,406 | 12/1931 | Kirsten . |
| 4,642,074 | 2/1987 | Phillips . |
| 4,871,344 | 10/1989 | Morisawa ............ 474/206 |
| 4,993,543 | 2/1991 | Lapeyre . |

FOREIGN PATENT DOCUMENTS 530979  11/1976  U.S.S.R. ............... 474/206

Primary Examiner—Michael Powell Buiz
Attorney, Agent, or Firm—Willian Brinks Hofer; Greg Dziegielewski

[57] ABSTRACT

A silent chain assembly of links having a single depending toe beneath one of the apertures of the link. The links are oriented into patterns to modify the patterns of contacts of the links with the sprocket teeth.

16 Claims, 2 Drawing Sheets

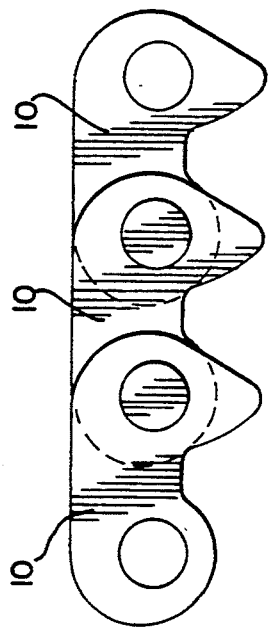
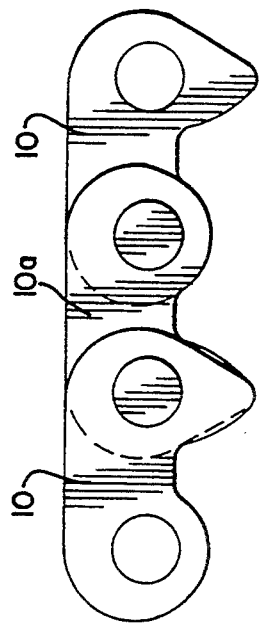
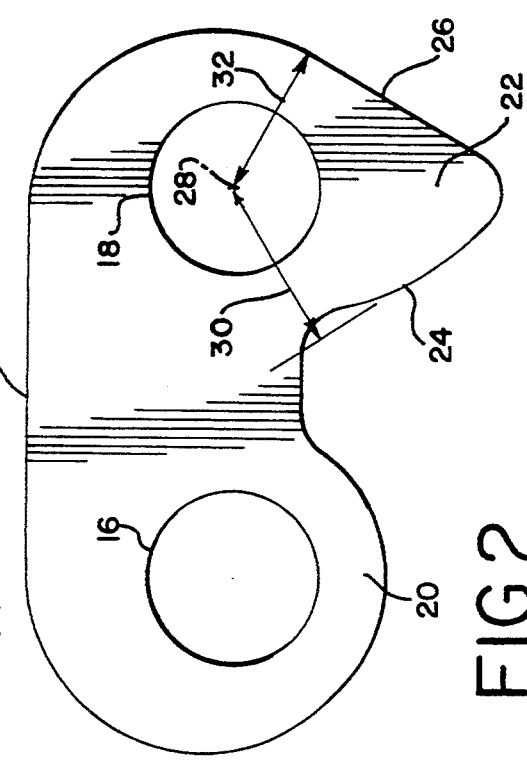
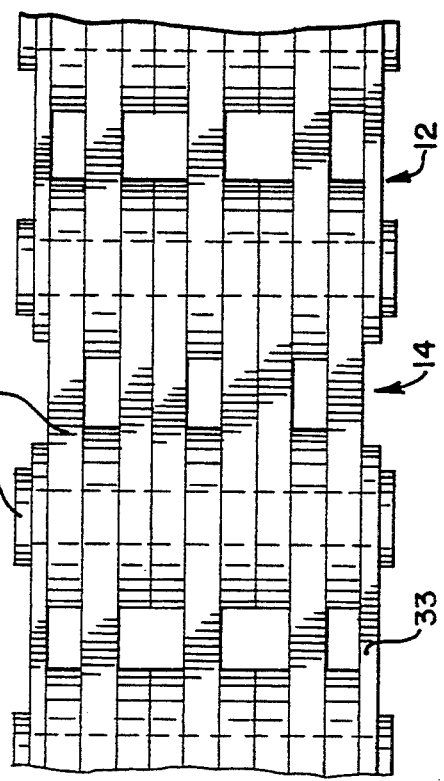

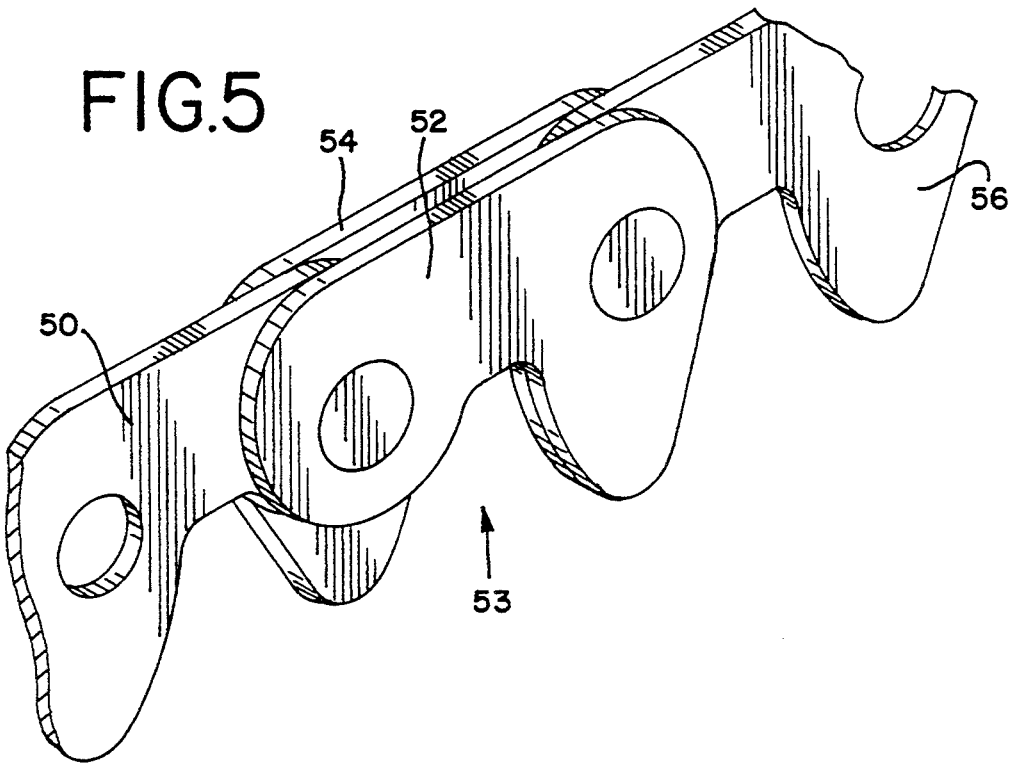
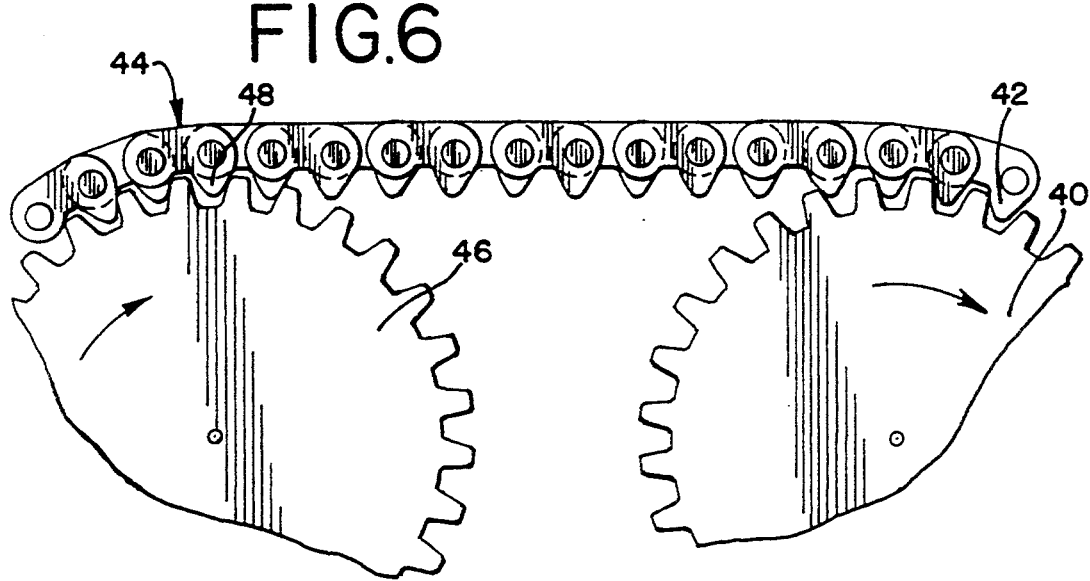

INVERTED TOOTH CHAIN CONSTRUCTED WITH LINKS HAVING A SINGLE TOE

BACKGROUND OF THE INVENTION

The present application is related to the subject matter of U.S. application Ser. No. 08/131,473, filed Oct. 4, 1993, which is a continuation-in-part application of U.S. application Ser. No. 07/885,194, filed May 19, 1992, now abandoned, entitled "Phased Chain Assemblies" which is incorporated herein by reference.

The present invention relates generally to power transmission chains. The invention has particular application to power transmission chains of the inverted tooth or silent chain variety, which are used in engine timing applications as well as in the transfer of power from a torque converter to a transmission or in a transfer case of a four-wheel-drive vehicle. The invention includes a chain assembly of inverted tooth links having a single sprocket engaging toe to transfer power between the chain assembly and an associated sprocket.

Power transmission chains are widely used in the automotive industry. Such chains are used for engine timing drives as well as for the transfer of power from a torque converter to the transmission or for the transfer of power in a transfer case. Power transmission chains are also widely used in industrial applications.

One type of power transmission chain is referred to as "silent chain". Such chain is formed of interleaved sets of inverted tooth links. A set or rank of links is assembled from several links positioned alongside of or adjacent to each other. The links are connected by pivot means, which are typically round pins received in a pair of apertures. An example of silent chain is found in U.S. Pat. No. 4,342,560, which is incorporated herein by reference. Another example of silent chain is found in U.S. Pat. No. 4,915,675, which is also incorporated herein by reference.

Conventional silent chains typically include both guide links and articulating links. The guide links are positioned on the outside edges of alternate sets of links. The guide links act to position the chain laterally on the sprocket. Guide links typically do not mesh with the sprocket teeth.

The inverted tooth links, or sprocket engaging links, provide the transfer of power between the chain and sprocket. Each inverted tooth link typically includes a pair of apertures and a pair of depending toes or teeth. Each toe is defined by an inside flank and an outside flank. The inside flanks are joined at a crotch. The inverted tooth links are typically designed so that the links contact the sprocket teeth to transfer power between the chain assembly and the sprocket. The inverted tooth or driving links contact the sprocket teeth along their inside link flanks or their outside link flanks or combinations of both flanks. The contacts between the flanks and the sprocket teeth can be of the type which provide a power transfer, or can be of the nature of an incidental or secondary contact.

A conventional silent chain drive is comprised of an endless silent chain wrapped about at least two sprockets supported by shafts. Movement of a driving sprocket causes power transmission through the chain and consequent movement of a driven sprocket. In an engine timing drive application, the driving sprocket is mounted on the engine crankshaft and the driven sprocket(s) mounted on one or more camshafts. The rotation of the camshaft(s) is thus controlled by the rotation of the crankshaft through the chain.

Noise is associated with such chain drives. Noise is generated by a variety of sources, but in silent chain drives it can be caused, in part, by the impact sound generated by the collision of the chain and the sprocket at the onset of meshing. The loudness of the impact sound is affected by, among other things, the impact velocity between the chain and the sprocket.

The meshing impact sound is generally a periodic sound in chain drives. The impact sound is repeated with a frequency generally equal to that of the frequency of the chain meshing with the sprocket. The frequency is related to the number of teeth on the sprocket and the speed of the sprocket. The impact can produce sound having objectionable pure sonic tones.

Another cause of noise in chain drives is the chordal action of the sprockets as the chain is driven about the sprockets. The meshing of the chain and sprocket at the chain mesh frequency can cause a movement of the free chain strand or span (the part of the chain between the sprockets) in a direction perpendicular to the chain travel but in the same plane as the chain and sprockets. This vibratory movement can also produce an objectionable pure sonic tone at the frequency of the chain mesh frequency or a derivative of it.

Many efforts have been made to decrease the noise level in chain drives of the silent chain variety by minimizing the objectionable effects of the pure sonic tones. The problem of noise reduction in silent chain drives was addressed in U.S. Pat. No. 4,342,560 by changing the contacts between the link flanks of a silent chain and the sprocket teeth by having differently configured link flanks in different sets of the chain. By mixing links of differing flank configuration, U.S. Pat. No. 4,342,560 attempted to modify the pattern of sound emanating from the chain contacting the sprocket by altering the types of link configurations and thus altering the point and rhythm of contacts. U.S. Pat. No. 4,915,675, which is incorporated herein by reference, utilized the same concept of modifying the pattern of sound emanating from the chain by altering the types of link configurations. That patent teaches the utilization of an asymmetrically shaped link form which is then oriented in two different directions in the chain assembly to alter the point and rhythm of chain to sprocket contacts.

Other attempts to alter the rhythm of contacts between the silent chain drive and the sprocket have focused on the modification of the sprocket teeth. For example, U.S. Pat. No. 3,377,875 and U.S. Pat. No. 3,495,468, teach relief of some of the sprocket teeth, or even elimination of some teeth, in order to achieve noise reduction in contacts between the links of the silent chain and the sprocket teeth.

The present invention utilizes an asymmetrical link to alter the point and rhythm of chain to sprocket contacts. The present invention seeks to provide a silent chain construction that modifies the pattern of chain and sprocket contacts and achieve noise reduction through the use of single toe links in the chain assembly.

Prior art chains have utilized single toe links. For example, U.S. Pat. No. 959,046 discloses a single toe guide link. However, the guide links act only to maintain the chain assembly on the sprockets. The guide links do not provide direct power transfer to or from the sprocket and thus do not impact the sprocket at the chain mesh frequency. Hence, the use of single toe guide links does not effect the noise spectrum produced by the articulating links.

U.S. Pat. No. 579,742 discloses a chain with single toe links that are located slightly off-center. The links engage the sprocket through antifriction balls that are trapped in sprocket cavities. All of the links of the chain have single toes.

U.S. Pat. No. 637,056 shows a chain with single toe links that are substantially centrally located. The patent discloses a chain having cylindrical sprocket teeth that come into contact with the link toe at its base. The contact of the link and the cylindrical toe is intended to occur on both sides of the toe. All of the links of the chain are single toe.

The single toe links in the present invention are utilized as the sprocket engaging links, or non-guide links, in an attempt to modify the pattern of contacts between the chain and the sprocket. In addition, because single toe links are of lighter weight construction, this may provide a significant advantage in certain mass sensitive applications.

SUMMARY OF THE INVENTION

In accordance with one embodiment of this invention, a silent chain includes links having a single toe depending from the link body. In the chain assembly, the links are interleaved together to form sets of links. Each link includes a pair of apertures, with an aperture from one set of links being aligned with an aperture from an adjacent set of links. Pivot means, in the form of round pins or rocker joints, are utilized to connect the adjacent sets of links through the apertures, and to allow pivoting of the sets of links with adjacent sets. Guide links are placed on alternating sets to maintain the alignment of the chain on the sprockets.

The single depending toe is located beneath one of the two apertures in the link. The links are oriented in one of the two possible directions. In one embodiment, all of the links are oriented in the same direction. In another embodiment, some of the links are oriented in one direction, while the remaining links are oriented in the opposite direction. The orientation of the links may be the same in a set of links, with the sets randomly arranged in a pattern throughout the chain. Alternately, the orientations of the links may be randomly arranged throughout the entire chain assembly. In another embodiment, the single toe links may be mixed with compatible links having two depending toes.

The configurations of the flanks of the depending toe may be substantially straight or arcuate. The configurations of the flanks, and the distances from the centers of the apertures to the flanks may be altered to modify the pattern of contacts between the links and the sprocket. In another embodiment, the locations of the apertures of the links with respect to a horizontal link centerline, between the centers of the two apertures, may be altered to change the orientation of the single toe link with respect to the sprocket. In the preferred embodiments, no sprocket modification is required to maintain appropriate and suitable chain and sprocket engagement.

Use of a silent chain and sprocket constructed in accordance with the teachings of the present invention is expected to result in the generation of a noise pattern that is modified in comparison with the noise pattern generated by a chain and sprocket in which all of the links are identical and have two depending teeth. The utilization of the single toe links, especially in various patterns of orientations, should decrease and vary the contacts between the chain links and the sprocket teeth. The chain assembly of this invention is suitable for use in a variety of types of chain assemblies and with a variety of sprocket tooth forms.

BRIEF DESCRIPTION OF THE DRAWINGS

For a more complete understanding of the invention, one should refer to the embodiments illustrated in greater detail in the accompanying drawings and described below by way of examples of the invention. In the drawings, which are not to scale:

FIG. 1 is a side elevational view of a single toed link of the present invention.

FIG. 2 is a top view of a portion of a chain assembly of the present invention.

FIG. 3 is a side elevational view of a portion of the chain assembly of a preferred embodiment of the present invention, illustrating single toe links, having a similar orientation, interconnected by a round pivot means FIG. 4 is a side elevational view of a portion of the chain assembly of a preferred embodiment of the present invention illustrating single toe links, having different orientations, interconnected by a round pivot means.

FIG. 5 is an exploded view of a portion of the chain assembly showing a pattern of assembly of the links of the chain of FIG. 3.

FIG. 6 is an illustration of a portion of each sprocket and a portion of the chain illustrating the expected sprocket tooth engagement.

DETAILED DESCRIPTION OF THE DRAWINGS

Referring now to the drawings, a chain link 10 having a single toe is illustrated in FIG. 1. The chain link 10 is combined with a plurality of chain links in side-by-side rows 12 or sets of links to form a chain assembly 14, which is shown more clearly in FIG. 2. A single set or row of links extends across the width of the chain and includes several interleaved links. A chain assembly is formed by combining or interleaving a single set or row of links, with adjacent sets or rows of links, to form the endless chain assembly.

The chain assembly of the present invention is utilized to drive, for example, an engine timing assembly, including a camshaft (not shown) and crankshaft (not shown). Sprockets, which are mounted on shafts, provide the means of power transfer between the chain and the two shafts.

The link 10, shown in FIG. 1, has a pair of apertures 16 and 18 which are configured to receive a round pin 19, shown in FIG. 2. The link 10 has a depending toe 22 located beneath aperture 18. The area of the link 20 under aperture 16 is rounded so as to avoid contact with the sprocket teeth. Thus, the link is effectively a single toe link with toe 22 being dimensioned for driving contact with the sprocket teeth. Driving contact refers to the primary engagement contact that transmits power between the chain and sprocket, in contrast to incidental or secondary contacts.

The toe 22 has an inside flank 24 and an outside flank 26. Depending on the orientation of the link and flank configurations, either the inside flank 24 or the outside flank 26, will contact the driving sprocket while the other flank will contact the driven sprocket. The flanks 24 and 26 of the present invention can have a number of various configurations, including straight or arcuate.

In a conventional chain in which all of the links are of identical configuration and oriented in the same direction, and have two inverted toes, the dimensions 30, 32, measured from the center 28 of the link aperture 18, establish which surface of the flanks of a link is intended to initially engage the sprocket. Thus, where dimension 30 is greater than dimension 32, the initial contact of the link with the sprocket tooth is intended to be on the inside flank 24. Similarly, where dimension 32 is greater than dimension 30, the initial contact of the link with the sprocket tooth is intended to be along the outside flank 26. However, in a chain of the current invention, the contact pattern is dependent on link orientation. As illustrated in FIG. 6, when the chain enters the driving sprocket 40, with the functional toe 42 of the link in the leading position, then initial engagement will be on the inside flank of toe 42. When that same link (shown as link 44) is engaged with the driven sprocket 46, the engagement of the functional toe (shown as 48) will be with the outside of the toe against the sprocket tooth.

In one embodiment of the link type of the present invention, the distance 30 is greater than distance 32. The distance 30 may be varied by alteration of the radius of curvature of the inside flank 24, or movement of the location of the centerpoint of the radius of curvature. In another embodiment of the link, the distance 30 is less than distance 32. In yet another embodiment, the chain assembly is constructed of combinations of links from these two embodiments. Modifications of the distances 30, 32 results in variation of the configurations of the flanks.

Varying the configurations of either flank 24 or 26, or of both flanks, modifies the type of links used in the chain assembly. Similarly, varying the size and/or placement of the apertures 16 and 18, the radius of curvature of the flank 24, or the distances 30 or 32, modifies the links of the chain assembly.

Sets of links of the chain assembly are connected to one another by a plurality of pivot members. Typical pivot members include a round pin or a pin and associated rocker. Each aperture of the link is appropriately configured to receive a pivot means.

Alternate sets of links include guide links 33 along their outside edge. The guide links are included in every other set of links and act to maintain the chain assembly on the sprockets. The guide links do not include any depending members or teeth for engagement with the sprockets.

In accordance with a preferred embodiment of the present invention, the chain links may be connected to one another such that the orientation of the single depending toe is uniform throughout the chain assembly. FIG. 3 illustrates a portion of a chain assembly configured according to this preferred embodiment. In an alternative preferred embodiment, the orientation of the single depending toe can be alternated or randomly arranged throughout the chain assembly, as illustrated in FIG. 4. The oppositely oriented links are designated as 10a.

In either of the aforementioned embodiments, the orientation of the single depending toe of the chain link disclosed herein determines which surfaces of the link engage the sprockets. Because the link of the disclosed invention has a single depending toe, the link has only one functional inner flank 24 and one functional outer flank 26. As previously described, regardless which flanks will engage the driving sprocket, the other flanks will engage the driven sprocket to provide a transfer of power between the chain and the sprocket.

In the FIG. 4 embodiment, an alternating of the orientations of the links results in contact with every other sprocket tooth. Thus, contact with the sprocket teeth does not occur between certain sets of links or at certain pin locations.

In another embodiment, the single toe links 10 are intermixed with two toed links in a hybrid chain. The sets of links in the chain may be of one type of links with the pattern of sets randomized throughout the chain. Alternatively, the two types of links may be interspersed throughout the chain assembly with the orientation of the single toe links also being changed throughout the chain.

FIG. 5 illustrates the use of single toe and two toed links in the same chain assembly. Link 50 has a single toe on the trailing aperture, while link 52 has the single toe on the leading aperture. Row 53 includes links 52 and 54 with their single toes on alternate apertures of the links. Link 56, which is in the adjacent row, has two toes. Various combinations and orientations of the links are possible and considered within the scope of the present invention.

In the embodiments where one or more links in a given set have alternate orientations, the dimensions 30 and 32 will determine which surface will engage the sprocket. In such a case, the same type of surface may engage both the driving and driven sprockets.

Use of a chain assembly or a sprocket constructed in accordance with the teachings of this invention is expected to result in the generation of a noise pattern that is modified in comparison with the noise pattern generated by a chain and sprocket in which all of the links are of identical configuration and have two toes. The chain assembly of this invention is suitable for use with a variety of sprocket tooth forms. Of course, some patterns of combinations of links will provide less objectionable noise characteristics than other patterns of links.

While several embodiments for the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A power transmission chain comprised of a plurality of interleaved sets of links, said links being adapted to contact the teeth of a sprocket, pivot members connecting adjacent sets of links, each link defining a pair of apertures for receiving said pivot members, said links having a single depending toe, said single toe being located beneath one of said apertures and adapted to contact the teeth of a sprocket, said links having a truncated portion beneath the other of said apertures.

2. The chain set forth in claim 1 wherein said toe includes two flanks, at least one flank of said flanks being substantially straight in configuration.

3. The chain set forth in claim 1 wherein said toe includes two flanks, at least one flank of said flanks being arcuate in configuration.

4. The chain set forth in claim 1 wherein said toe includes two flanks, at least one flank of said flanks being substantially straight in configuration and the other flank being of a different configuration.

5. The chain set forth in claim 1 wherein some sets of links include links oriented in a first direction, others of said sets of links include links oriented in an opposite direction.

6. The chain set forth in claim 5 wherein said some sets are randomly arranged with said other sets.

7. The chain set forth in claim 1 wherein some of said links are oriented in a first direction and others of said links are oriented in an opposite direction, said links being randomly arranged throughout the chain.

8. The chain set forth in claim 1 wherein some of said links include a second toe, said second toe being adapted to contact the teeth of a sprocket.

9. The chain set forth in claim 1 wherein some of said links include a second toe, said second toe being adapted to contact the root of the sprocket.

10. The chain set forth in claim 1 wherein some of said links include a second toe, said second toe being rounded and constructed to minimize contact with the sprocket teeth.

11. The chain set forth in claim 1 wherein some of said links include apertures having centers spaced a first distance from a horizontal link centerline, and others of said links include apertures having centers spaced a different distance from a horizontal link centerline.

12. The chain set forth in claim 1 wherein said pivot member is a round pin.

13. The chain set forth in claim 1 wherein said truncated portion is constructed to avoid contact with the sprocket teeth.

14. A single toe link for a chain assembly, said chain assembly including a plurality of interleaved sets of links, said links being adapted to contact the teeth of a sprocket, pivot means connecting adjacent sets of links, said single toe links being interleaved in said chain assembly, said single toe link comprising:

a link body having a pair of apertures for receiving said pivot means, a single tooth depending from said link body, said single tooth being located beneath one of said apertures and adapted to contact the teeth of a sprocket, said link body having a truncated portion beneath the other of said apertures.

15. The single toe link of claim 14 wherein said toe includes two flanks of different configurations.

16. The single toe link of claim 15 wherein one of said configurations is a substantially straight configuration.

* * * * *